US008681967B1

(12) United States Patent
Johnson et al.

(10) Patent No.: US 8,681,967 B1
(45) Date of Patent: Mar. 25, 2014

(54) METHOD AND APPARATUS OF APPLYING CALL SUPPRESSION MEASURES TO RESTRICT PHONE CALLS

(75) Inventors: Rebekah Johnson, Grand Bay, AL (US); Baron Morvant, Mobile, AL (US); William Corey Howard, Citronelle, AL (US)

(73) Assignee: West Corporation, Omaha, NE (US)

( * ) Notice: Subject to any disclaimer, the term of this patent is extended or adjusted under 35 U.S.C. 154(b) by 0 days.

(21) Appl. No.: 13/329,812

(22) Filed: Dec. 19, 2011

(51) Int. Cl.
*H04M 3/42* (2006.01)
*H04M 1/66* (2006.01)
*H04M 1/68* (2006.01)
*H04M 3/16* (2006.01)

(52) U.S. Cl.
USPC ............ 379/210.02; 379/201.01; 379/207.02; 379/207.03; 379/211.01; 455/410; 455/417

(58) Field of Classification Search
USPC ................. 379/210.02, 93.17, 88.03, 210.01, 379/211.01, 201.01, 207.02, 207.03; 455/410, 417
See application file for complete search history.

(56) References Cited

U.S. PATENT DOCUMENTS

| 7,796,973 B2* | 9/2010 | Lauridsen et al. ............. 455/410 |
| 7,957,509 B2* | 6/2011 | Crockett et al. ............ 379/88.03 |
| 2008/0279359 A1* | 11/2008 | Tiliks et al. ............... 379/210.02 |
| 2009/0103696 A1* | 4/2009 | Davison .................... 379/93.17 |

* cited by examiner

*Primary Examiner* — Thjuan K Addy

(57) ABSTRACT

A method, apparatus and non-transitory computer readable medium for determining whether to perform telephone call blocking. One example method of operation provides initiating a telephone call from a call server, determining whether the call is a solicitation call and determining the area code of the call and performing a lookup operation of the area code in a call suppression database. The method may also include retrieving a call block entry for a current day from the call suppression database, and comparing the area code to the call block entry for the current day to determine whether the call should be blocked.

20 Claims, 11 Drawing Sheets

Specific Days of Week and Suppressions by State for Solicitations

Note: Sunday Reoccuring

Excluded
- FEDERAL
- North Carolina
- Texas
- Washington
- Maine
- Arkansas
- New Jersey

Included
- Alabama
- Louisiana
- Mississippi
- Rhode Island
- Utah
- Arizona ☐ Allow Calling Hours?

Start Time: 8AM
End Time: 8PM

Day of Week Suppression
- ☐ Monday
- ☐ Tuesday
- ☐ Wednesday
- ☐ Thursday
- ☐ Friday
- ☐ Saturday
- ☒ Sunday

[ Save ]  [ Cancel ]

METHOD AND APPARATUS OF APPLYING CALL SUPPRESSION MEASURES TO RESTRICT PHONE CALLS

TECHNICAL FIELD OF THE INVENTION

This invention relates to a method and apparatus of restricting undesired phone calls to an end user, and in particular, to providing a phone system that automatically applies rules and regulations to a telephone network to regulate the times, frequency and/or source of telephone calls to the end user.

BACKGROUND OF THE INVENTION

Users may be called by business organizations at any time on their home phone, mobile phone or even their office telephone. Generally, the calls received by any individual user may be from a business or organization that the user has no desire to contact. The calls may be soliciting services or charities of which the user is not interested in participating or offering money to support.

Various state and Federal government laws, rules and regulations offer users privacy from unwanted calls. However, those laws may be difficult to enforce and violations may be even more difficult to report. Current phone systems are not equipped with options to automatically apply state and Federal rules with regard to limits on the hours, days and times that solicitations are made to the user. Business organization may have no desire to violate the terms of these government rules and regulations. However, keeping track of the dates, times and localities being called on any given day may be difficult.

SUMMARY OF THE INVENTION

One embodiment of the present invention may include a method of determining whether to perform telephone call blocking. The method may include initiating a telephone call from a call server, determining whether the call is a solicitation call, and determining the area code of the call and performing a lookup operation of the area code in a call suppression database. The method may also provide retrieving at least one call block entry for a current day from the call suppression database, and comparing the area code to the at least one call block entry for the current day to determine whether the call should be blocked.

Another example embodiment of the present invention may include an apparatus configured to determine whether to perform telephone call blocking. The apparatus may include a transmitter configured to transmit a telephone call. The apparatus may also include a processor configured to determine whether the call is a solicitation call, determine the area code of the call and perform a lookup operation of the area code in a call suppression database, and retrieve at least one call block entry for a current day from the call suppression database. The processor is also configured to compare the area code to the at least one call block entry for the current day to determine whether the call should be blocked.

BRIEF DESCRIPTION OF THE DRAWINGS

FIGS. 2A and 2B illustrate example call suppression graphical user interfaces according to example embodiments of the present invention.

FIGS. 3E and 3F illustrate another editable date suppression graphical user interface according to example embodiments of the present invention

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Figure 1:
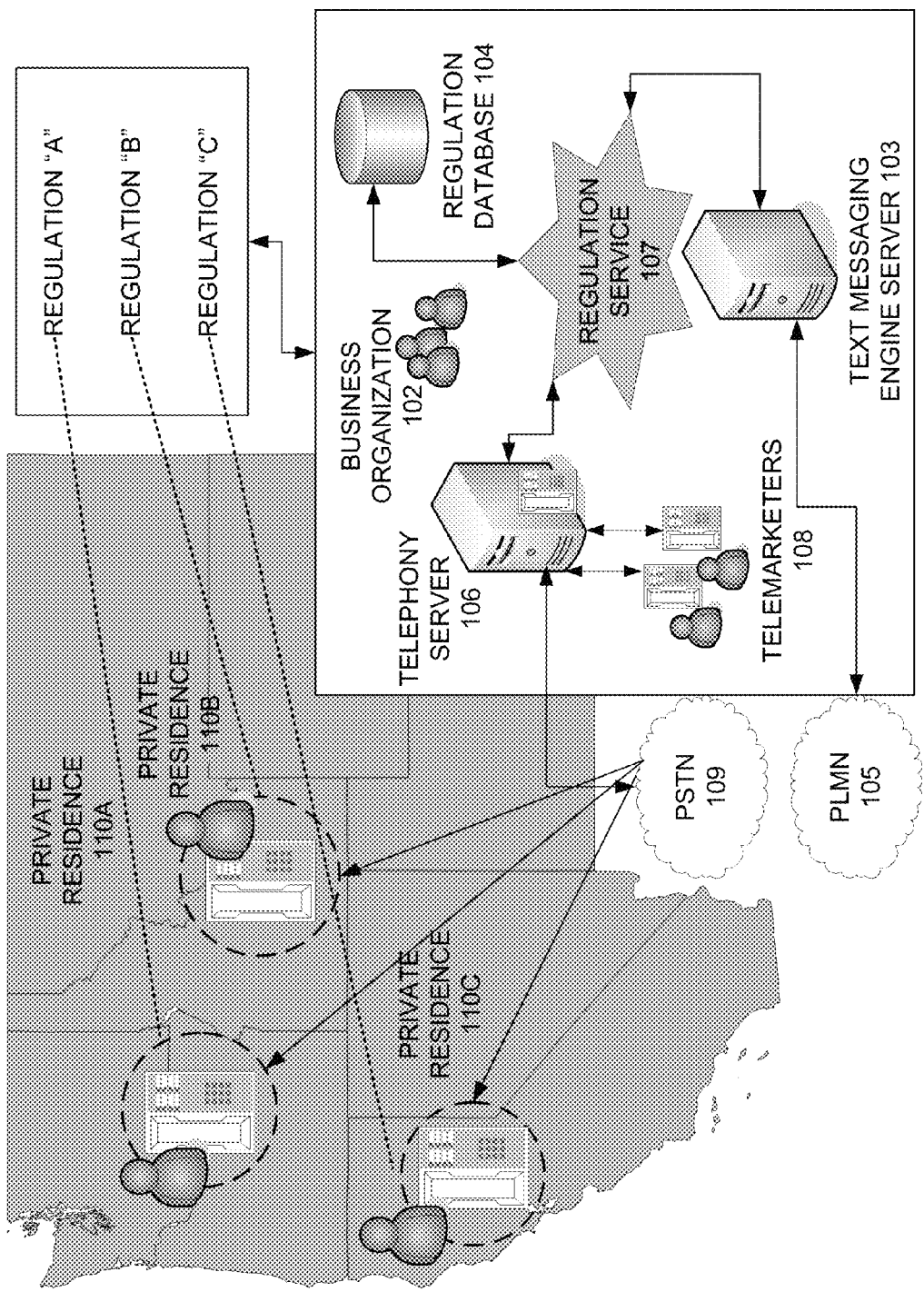
FIG. 1 illustrates an example call suppression communication system according to example embodiments of the present invention.

FIG. 1 illustrates a telephone communication regulation system according to example embodiments of the present invention. Referring to FIG. 1, the telephone communication system may be regulated on the side of the business organization 102 to provide an automated call dialing regulator based on local, state and/or federal regulations. The regulations may be stored in a telephony regulation database 104. In this example, the business organization 102 includes a telephony server used to provide dialing features for the telemarketers 108 to dial-out to the end users (private residences 110A, 110B and 110C). The telemarketers 108 are also in communication with a text messaging engine server 103 which communicates over a public land mobile network (PLMN) 105. A regulation database 104 provides a record of the various different regulations corresponding to the various different demographics. A regulation service 107 provides an engine to communicate those regulations to the call and text message initiation platforms 106 and 103, respectively.

The regulations of each of the three respective private residences 110A, 110B and 110C may be based on Federal, state and local government laws and regulations. As may be observed from FIG. 1A, each of the three example private residences are located in different states across the United States. Each of the private residences is located in a geographically unique area that may be identified by a zip code, area code, postal code, etc., each of which may be used by the telephony regulation database 104 to distinguish certain regulations from one another. For example, the telephony regulation database may organize regulations by state, zip code and/or area code. Such regulations may be regularly updated and downloaded to the database 104 for cross-referencing by the telephony server 106 when attempting to dial a particular user located in a particular geographical area.

Phone calls originated from the telephony server 106 may be automatically selected from a spreadsheet of end users' telephone numbers. Once the call is dialed, the call in progress may be handed over to a telemarketer 108 automatically via a call distribution scheme handled by the telephony server 106. The call may be routed to the public switched telephone network (PSTN) 108, which routes the call to its intended destination. The business organization 102 may be responsible for regulating its own phone calling procedures and may require a call regulation system to be adapted to its internal calling infrastructure. Alternatively, the call dialing may be performed with the assistance of a third party calling service that matches individual end users or call destinations to the geographical regulations that are enacted within the end users' locations.

The regulation service 107 may provide regulation information to the calling and text messaging platforms. For instance, the regulation service 107 may be utilized by the telephony server 106 and/or text messaging server 103, which are responsible for sending notifications to the intended recipients. For example, the regulation service 107 may provide a list of zones that are eligible for a regulation to be applied, a list of zone types. (Federal, State, Area Code, etc.), a list of channels (delivery methods) that are eligible for a regulation block to be applied, a listing of all active one time regulation blocks for a given date and time, a listing of all active reoccurring regulation blocks for a given date and time, a listing of active one time regulation blocks that are currently in effect based on the start and end times for the regulation, adjusted for the local time zone and broken down by area code, the most granular zone type available, a listing of active reoccurring regulation blocks that are currently in effect, adjusted for the local time zone and broken down by area code, the most granular zone type available. Any regulations with an 'allowed window' are not included. Other features of the regulation service 107 may allow the deactivation of existing one time and reoccurring regulations, a way to create a new one time block or reoccurring regulation blocks for a given zone and channel, and a way to log notifications that have been blocked due to the existence of a specific one time or reoccurring regulation.

Figure 2A:
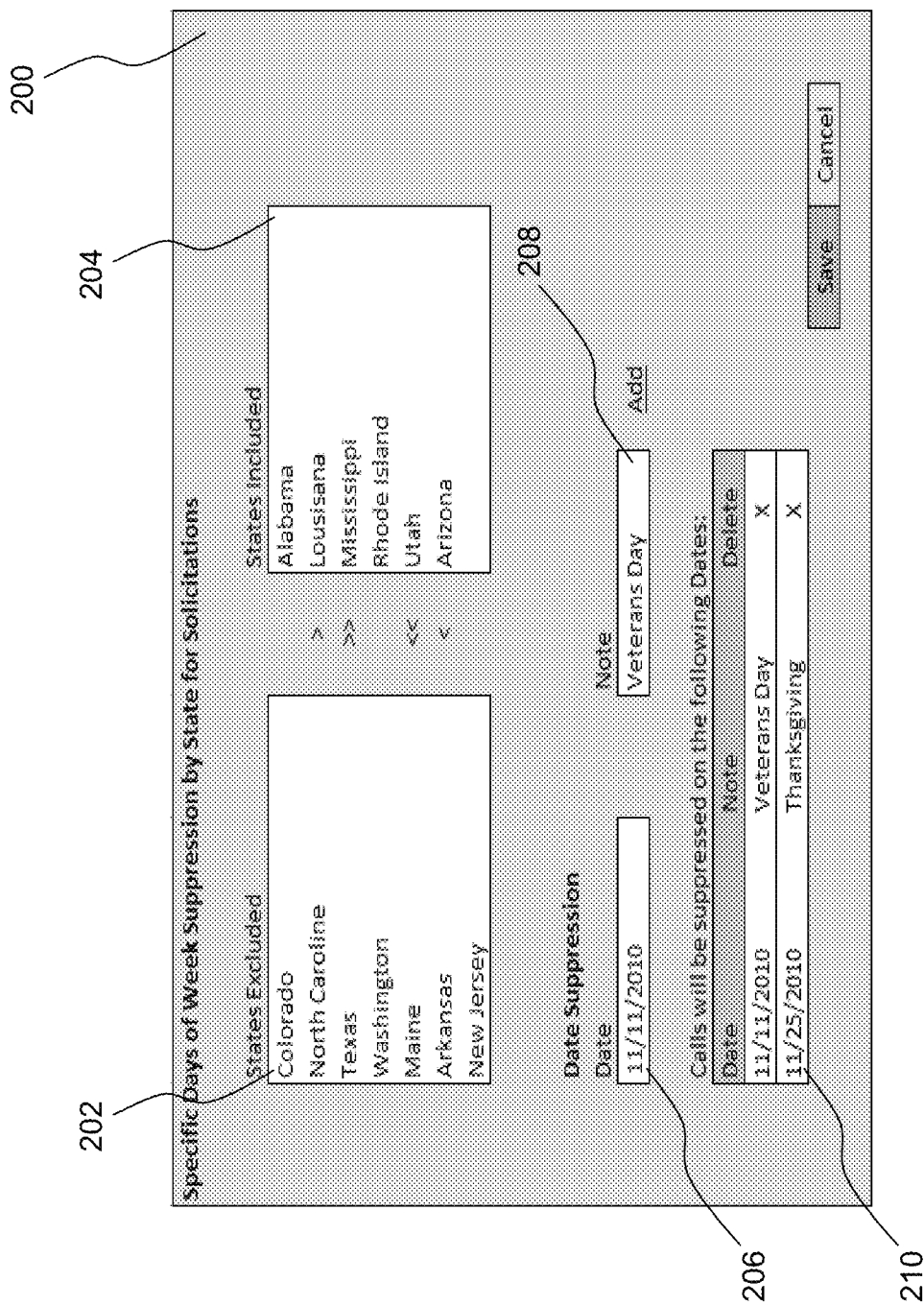

FIG. 2A illustrates an example graphical user interface (GUI) application used to initiate a call suppression procedure, according to example embodiments. Referring to FIG. 2A, a window 200 provides a user with a view of the basic call suppression setup for a statewide selection procedure. For example, certain states with stringent regulations that are not cohesive to the business organizations interests or communication procedures may be selected in a state exclusion window 202. Other states that are desirable for call solicitation purposes may be included in a state inclusion window 204. A particular date 206 may be added as day that calls will be suppressed or not allowed for any of the selected states. A note section 208 may provide a place to comment about the suppression date, and a result section 210 may summarize the actions performed by the call administrator setting up the call regulation system.

FIG. 2B illustrates another example graphical user interface (GUI) application used to initiate a call suppression procedure, according to example embodiments. Referring to FIG. 2B, a window 220 provides a user with another view of the basic call suppression setup for a statewide selection procedure. A particular day(s) of the week 222 may be selected as a day that receives reoccurring call suppression. Similar to FIG. 2A, the excluded states 226 and included states 224 may be setup manually by the administrator. A day of the week suppression menu 228 may offer an easy way to select the day(s) of the week that calls should be suppressed. In addition an hourly schedule 230 may be setup to provide a time-frame during which calls may be processed and dialed to the selected states on the allowed days. Multiple day suppressions for one or more states may be added at one time. If "allow calling hours" is unchecked, when the user selects the save button, the call suppression will be in effect the entire day from 12:00:00 AM to 11:59:59 PM.

Figures 3A, 3B:
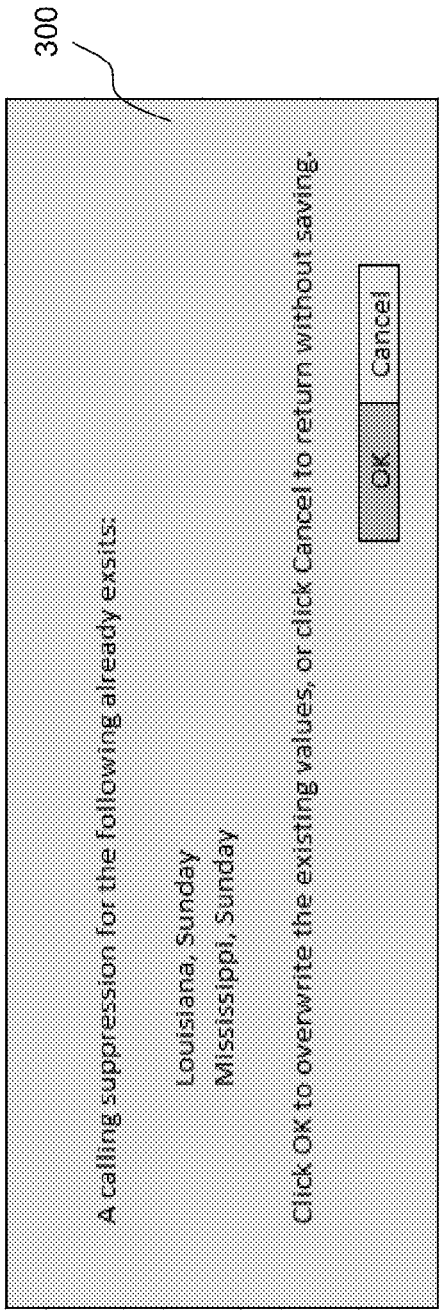
FIGS. 3A and 3B illustrate yet another example call suppression graphical user interface according to example embodiments of the present invention.

FIG. 3A illustrates a GUI 300 used to inform the user of a call suppression conflict with a previously selected call suppression schedule, according to example embodiments. When such a scheduling conflict is presented, the user may accept the overriding new schedule or cancel and revert back to the previous call suppression schedule.

FIG. 3B illustrates a call solicitation suppression schedule 310. The schedule may have been previously setup and modified to include additional holidays or days of the week when calls should be suppressed. In menu 310, the user may be able to view values for existing call date suppressions. Fields, such as zone 311, zone type 312, date 313, day of week 314, status 315, note 316 and actions 317 correspond to each call suppression entry. The zone entry 311 will display the state name and may also include the zip code and area code. The zone type 312 displays the type of zone, such as state, zip code, area code, federal zone, etc. The action column 317 will display a link to edit the record or remove the record from the list.

The user may be able to sort and filter each column except for the actions column 317, which provides options to remove or edit the existing call suppression entry. Selecting the remove option will delete the entry from the database 104. If a record is active, within 15 minutes of removing the record, the system will acknowledge removal of the suppression. Selecting the edit action will open the screen shown in FIGS. 3C and/or 3D. If the status of a date suppression record is 'complete', the user will not be able to edit or remove the record. If the status of a date suppression record is 'pending', the user will not be able to edit the record.

Figure 3C:
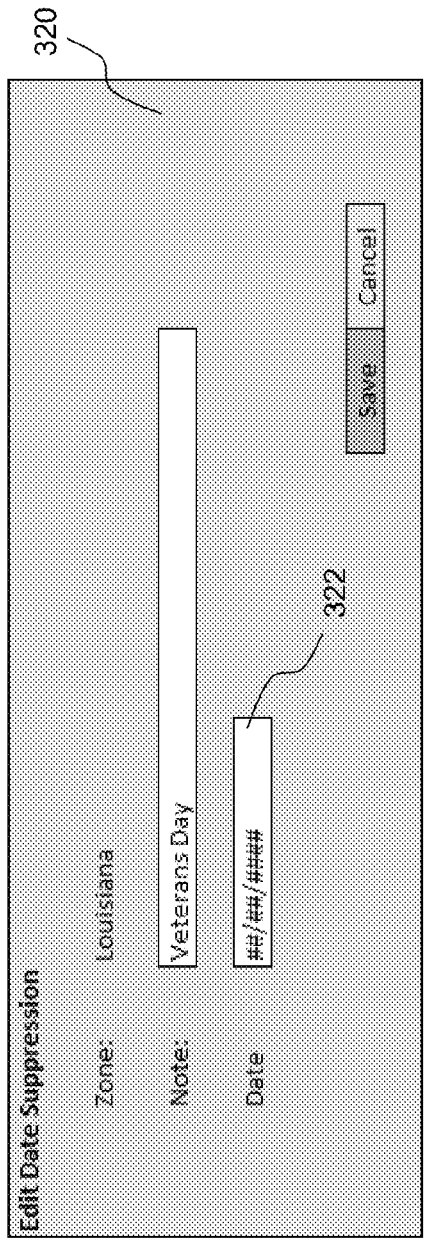
FIGS. 3C and 3D illustrate an editable date suppression graphical user interface according to example embodiments of the present invention.
Figure 3D:
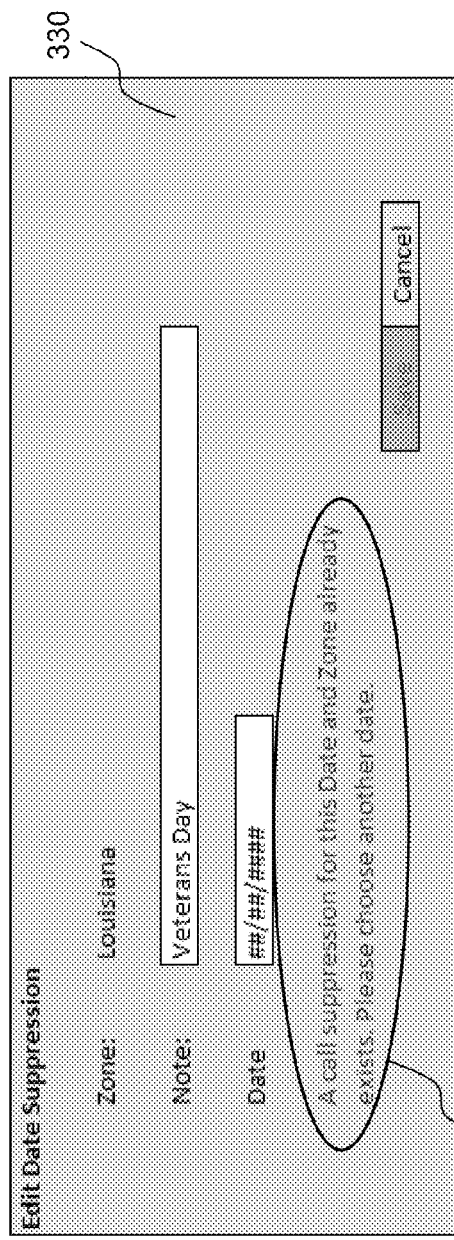

FIGS. 3C and 3D illustrate an editable date suppression graphical user interface according to example embodiments of the present invention. Referring to FIG. 3C, date suppression menu 320 provides a particular zone which has been selected "Louisiana" corresponding to a particular date 322 that a call suppression is supposed to be enacted. In FIG. 3D, the menu 330 provides feedback 332 from the system that a call suppression schedule is already in existence for the selected zone and date. The save button on the edit date suppression menu 330 will remain inactive until a valid date and note is entered into the screen.

Figures 3E, 3F:
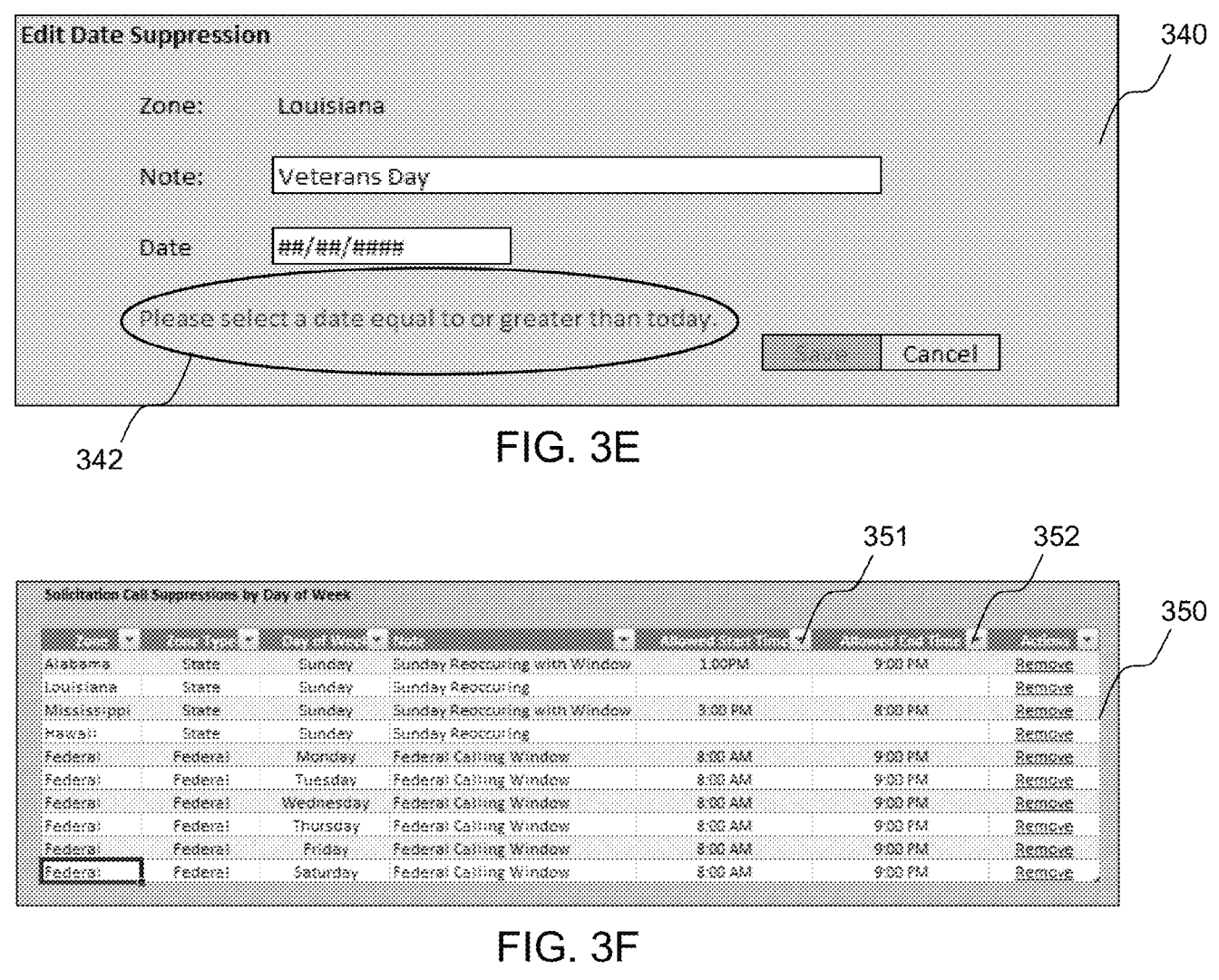

FIGS. 3E and 3F illustrate another editable date suppression graphical user interface according to example embodiments of the present invention. Referring to FIG. 3E, a menu option 340 provides feedback 342 that a date may be selected that is equal to or greater than today, to guide the user to select an appropriate date that may be accepted by the date suppression schedule. FIG. 3F illustrates further details of the existing call suppression entries 350. These entries are similar to those illustrated in FIG. 3B, however, additional entries, such as start time 351 and stop time 352 may be used to create a window of time when call suppressions may be active or inactive.

Figure 4:
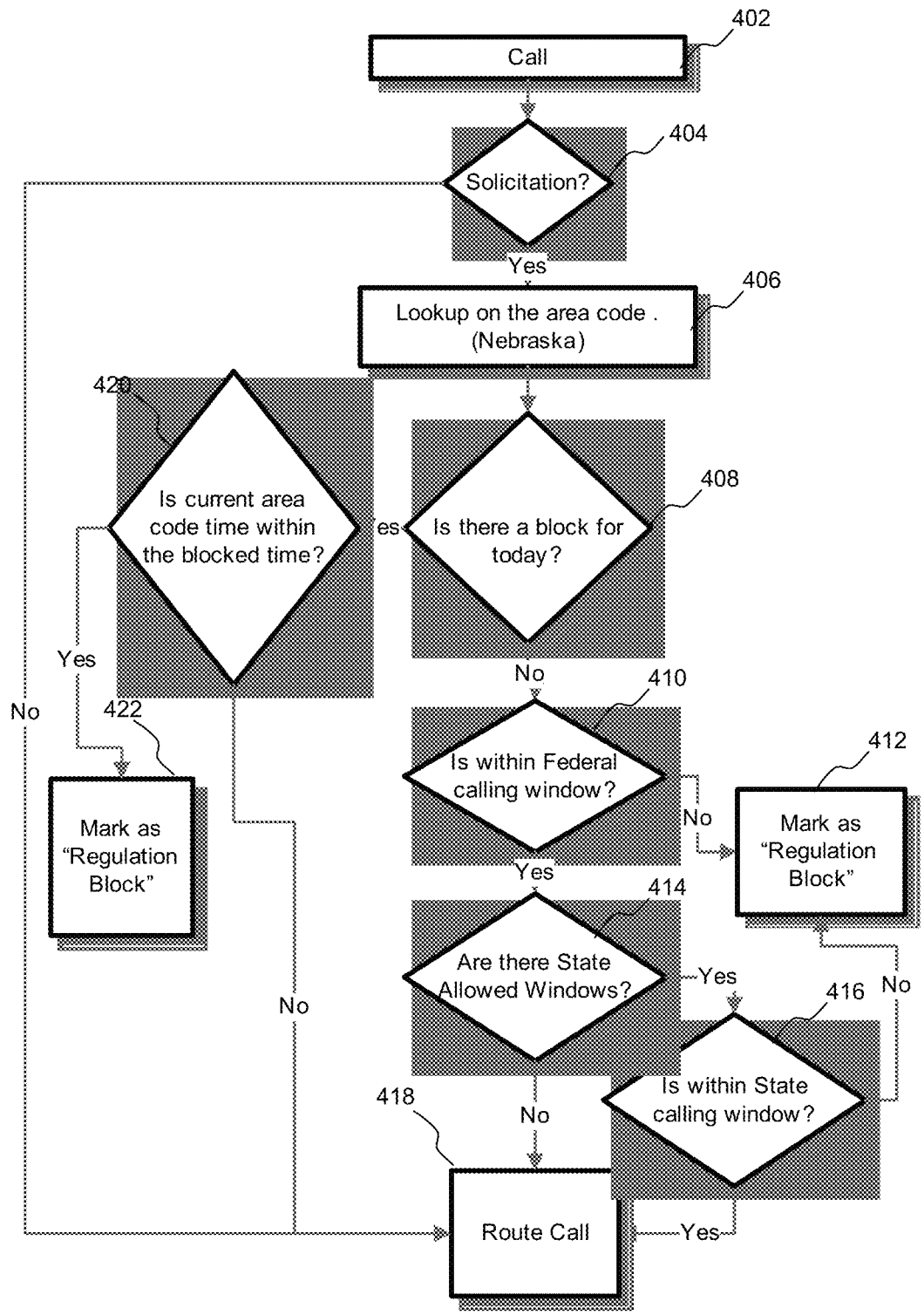
FIG. 4 illustrates a flow diagram of an example method according to example embodiments of the present invention.

FIG. 4 illustrates a flow diagram of an example method according to example embodiments of the present invention. The call suppression system of the business organization 102 may follow a particular logic or method of operation when determining whether a call should be suppressed or routed. For example, a call may be initiated at operation 402. The call may be designated as a solicitation type of call at operation 404. If the call is not a solicitation, it may be routed without delay at operation 418. If the call is a solicitation, the area code of the call may be looked up at operation 406. Next, a determination may be made as to whether a current call block is in place for today at operation 408. In this operation, the telephony regulation database 104 may be accessed by the telephony server 106 to view the call blocks that are scheduled for the current day.

If the call block does exist, the current area code of the call will be matched against the existing call block entry at operation 420. If the current area code of the call is part of the blocked entries, then the result will be marked as a "regulation block" at operation 422, which flags the call as "not routed." Alternatively, if there is no call block present for the current day, or the call block does not prevent the call from being routed, an additional regulation may be checked, such as whether the call is violating a Federal calling window regulation (e.g., no calls allowed 9 PM through 8 AM, etc.), at operation 410. If the Federal window is being violated, the call may be marked as a "regulation block" at operation 412. If the Federal window is not being violated, then state laws may be checked by mapping the area code of the call to the particular state at operation 414. If a state regulation does exist, the state's calling window may be checked at operation 416, and if it is not in violation the call may be routed at operation 418.

Figure 5:
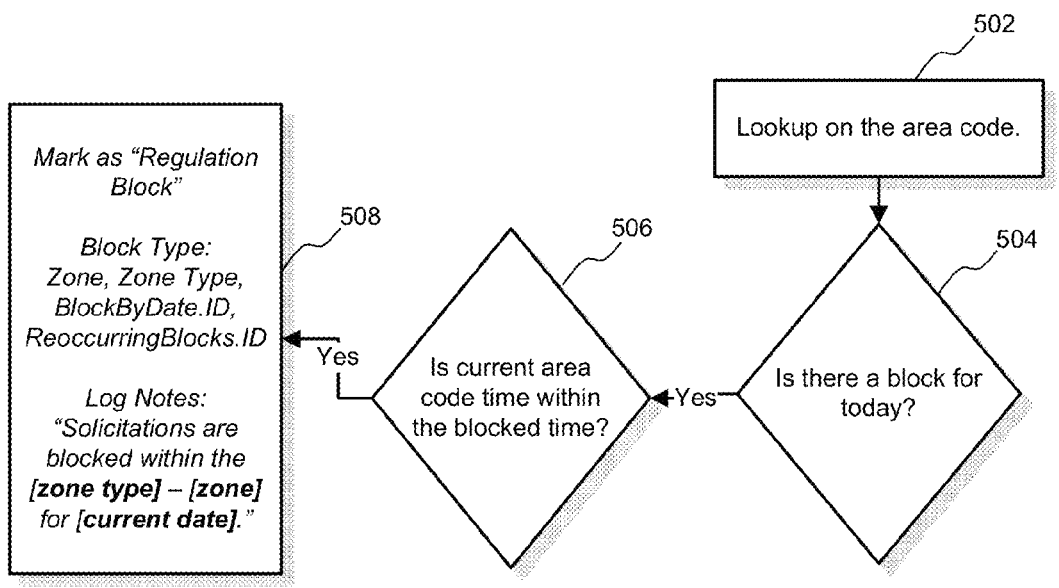
FIG. 5 illustrates another flow diagram of an example method according to example embodiments of the present invention.

FIG. 5 illustrates another flow diagram of an example method according to example embodiments of the present invention. Referring to FIG. 5, when a call is placed, the call area code is referenced at operation 502 to determine whether a call block is active at operation 504. If so, the current time corresponding to the area code's location is determined and that local time is used as a basis to determine whether a block is present at operation 506. If so, the call is marked as a regulation block in the database 104 and a response message is generated based on the time, location and date referenced from the database 104 at operation 508.

Figure 6:
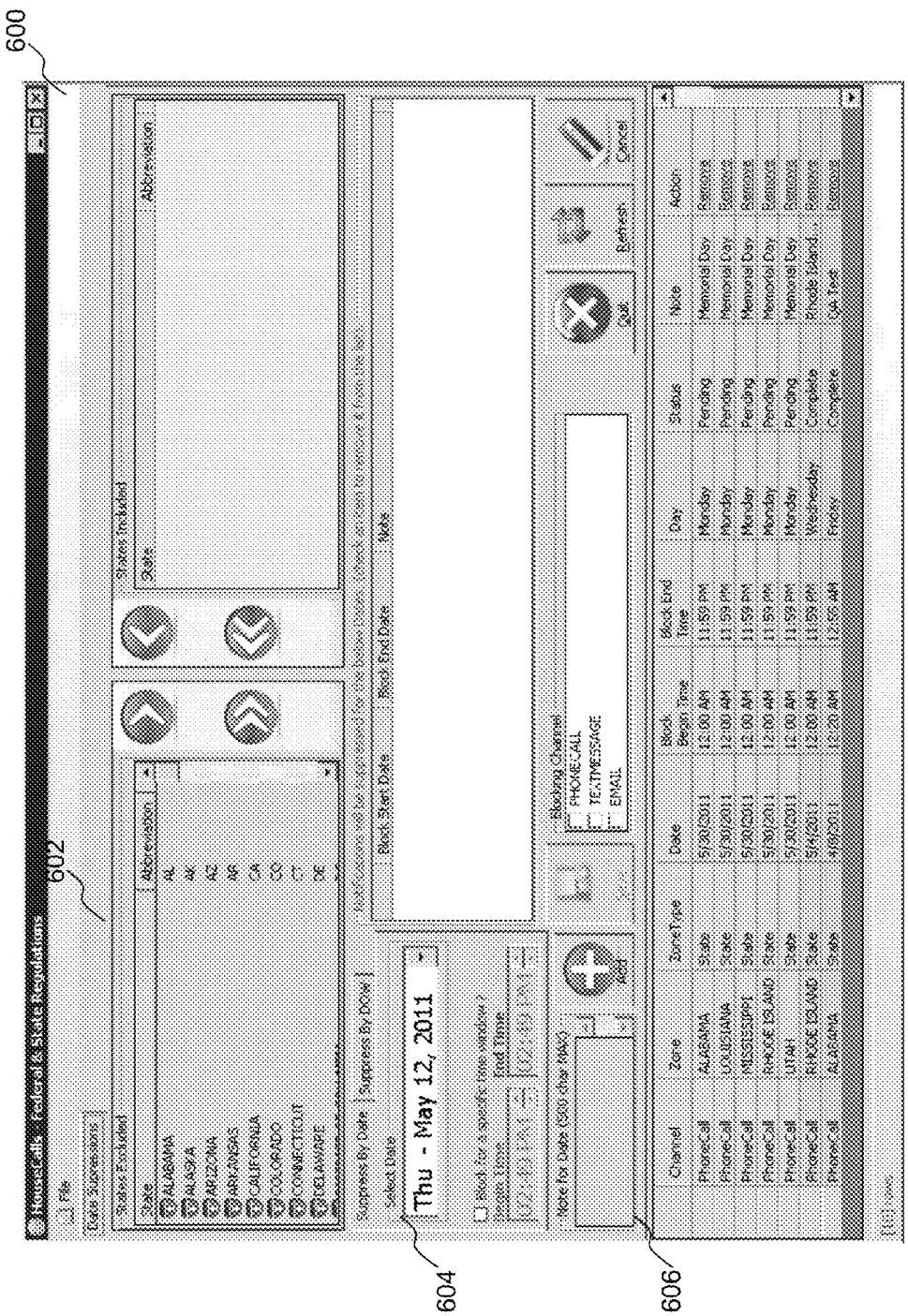
FIG. 6 illustrates an example graphical user interface of a call regulation system according to example embodiments of the present invention.

FIG. 6 illustrates an example graphical user interface of a call regulation system according to example embodiments of the present invention. Referring to FIG. 6, the interface 600 provides support for various different compliance tools, which are accessed through a centralized interface. The interface provides a way to enables the call processing platform to block solicitation-based communications driven by continually evolving Federal and State regulations.

Through the interface 600, compliance leaders who monitor the dynamic regulatory environments that impact business-to-consumer communications (e.g., FTC, FCC, HIPAA, and State Regulations) have the capability to initiate global and state-specific call blocking rules, including the ability to apply specific dates, recurring days, and time blocking settings for specific hours in a day.

An input interface 602 included in the top section of the user interface 600 provides the capability to select the specific states that will be included in the suppression. The central portion 604 of the user interface focuses on the specific dates or days of the week that will be evaluated for the blocked timeframe as well as notes regarding the reason for the regulation. The lower section 606 summarizes the blocks that have been added and the active call filters and regulations that are presently active.

Storage of the criteria input is housed in the regulation database. From these settings, the platform evaluates the communication delivery times based on the time zone of the message recipients to determine when calls can be placed based on the configuration settings specified by the conditions for each regulation.

Figure 7:
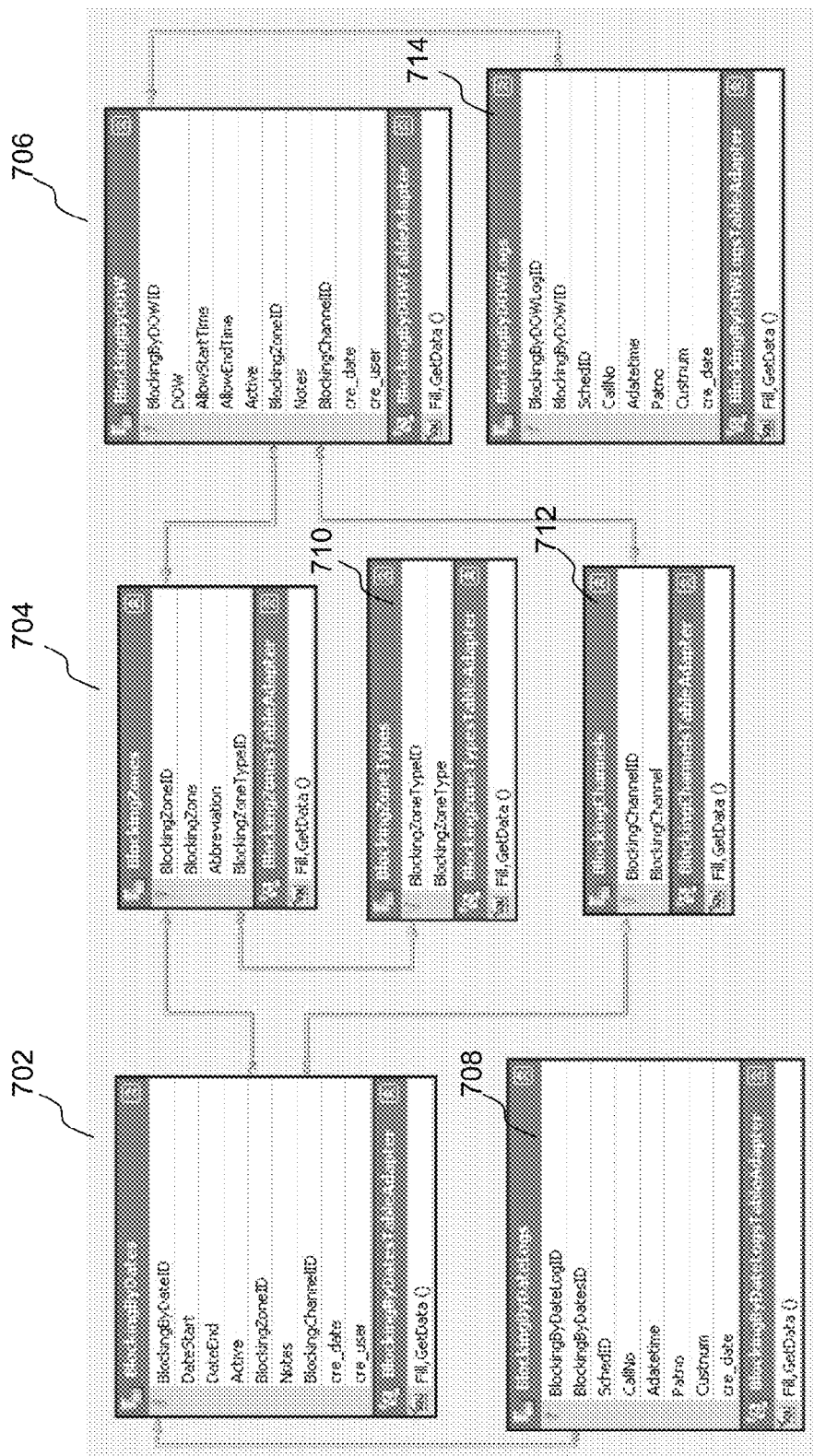
FIG. 7 illustrates a database logic diagram illustrating the logical relationships between the various entities.

FIG. 7 illustrates a logic diagram of the database entity relationship diagram. Referring to FIG. 7, a 'BlockingZoneTypes' entity is configured to store the categories under which 'BlockingZones' 704 can be categorized. This is generally used to denote the scope in area for which a regulation block is intended. Examples of 'BlockingZoneType' entries include Federal, State, Area Code, etc. 'BlockingZones' 704 contains all of the zones that are available to be associated with a particular regulation. Examples include Federal, Alabama, Florida, 205, 251, 850, etc. 'BlockingChannels' 712 provides a listing of the delivery method affected by a regulation (e.g., voice calls and text messages).

'BlockingByDates' 702 stores regulations where the scope of the regulation is to be in effect one particular time. These regulations are associated with specific channels and zones and are in effect for the date range stored in the table. Once a regulation has been entered, it cannot be deleted or modified, only deactivated. The date and user associated with the regulation's entry is also stored.

'BlockingByDateLogs' 708 stores a history of voice calls that have been blocked due to a one time regulation. 'BlockingByDOW' 706 collects regulations where the scope of the regulation is reoccurring for a zone and channel for a specific day of the week. The 'AllowStartTime' and 'AllowEndTime' fields of 706 provide for exceptions of a daily reoccurring regulation for a portion of the day. For example, all calls to Louisiana are blocked on Sundays with the exception of the hours of 9:00 AM to 5:00 PM. Once a regulation has been entered, it cannot be deleted or modified, only deactivated. The date and user associated with the regulation's entry is also stored. The 'BlockingByDOWLogs' entity 714 stores a history of voice calls that have been blocked due to a reoccurring regulation.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 8 illustrates an example network element 800, which may represent any of the above-described network components of FIG. 1.

Figure 8:
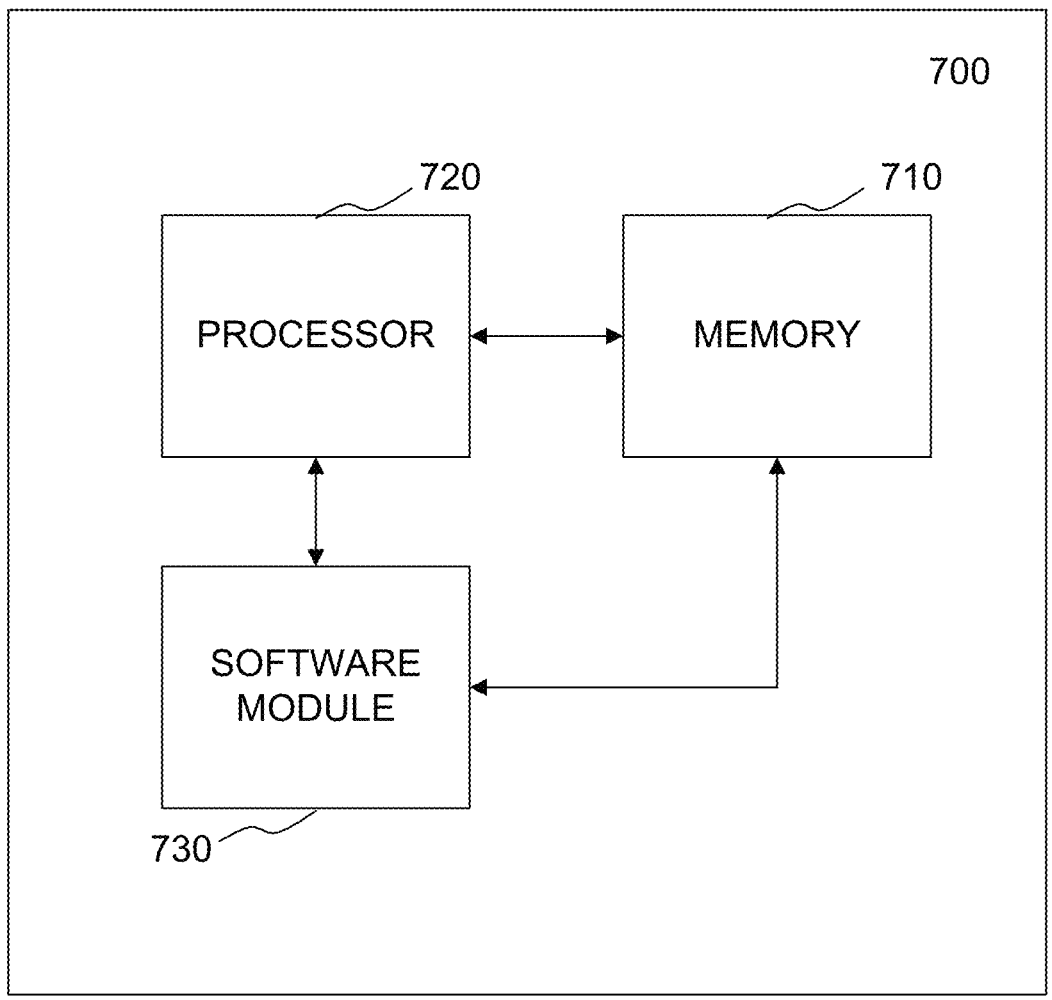
FIG. 8 illustrates a network entity that may include memory, software code and other computer processing hardware, according to example embodiments of the present invention.

As illustrated in FIG. 8, a memory 810 and a processor 820 may be discrete components of the network entity 800 that are used to execute an application or set of operations. The application may be coded in software in a computer language understood by the processor 820, and stored in a computer readable medium, such as, the memory 810. Furthermore, a software module 830 may be another discrete entity that is part of the network entity 800, and which contains software instructions that may be executed by the processor 820. In addition to the above noted components of the network entity 800, the network entity 800 may also have a transmitter and receiver pair configured to receive and transmit communication signals (not shown).

One example embodiment of the present invention may include a method of

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method of determining whether to perform outgoing telephone call blocking from a business organization that performs outgoing solicitation calls and outgoing non-solicitation calls, the method comprising:
   initiating an outgoing telephone call from a call server of the business organization to a destination number comprising an area code;
   determining, by the business organization, whether the outgoing call is a solicitation call;
   when the outgoing call is a solicitation call:
   determining the area code of the call and performing a lookup operation of the area code in a call suppression database;
   retrieving at least one call block entry for a current day from the call suppression database; and
   comparing the area code to the at least one call block entry for the current day to determine whether the call should be blocked.

2. The method of claim 1, wherein if the call is not a solicitation then routing the call.

3. The method of claim 1, further comprising:
   blocking the call responsive to matching the area code with the at least one call block entry.

4. The method of claim 1, further comprising:
   determining that the area code is not blocked by the at least one call block entry; and
   determining whether the call is violating an additional call regulation.

5. The method of claim 4, wherein the additional call regulation is at least one of a state regulation and a Federal regulation.

6. The method of claim 5, wherein the state regulation is applied to the call based on the area code of the call and an area code of the state stored in the call suppression database.

7. The method of claim 6, wherein the state regulation blocks the call based on a prohibited calling window of time that solicitation calls are not permitted to be made.

8. An apparatus configured to determine whether to perform telephone call blocking of an outgoing call, the apparatus comprising:
   a transmitter configured to transmit a telephone call to a destination number comprising an area code; and
   a processor configured to
   determine whether the outgoing call is a solicitation call;
   determine the area code of the call and perform a lookup operation of the area code in a call suppression database,
   retrieve at least one call block entry for a current day from the call suppression database, and
   compare the area code to the at least one call block entry for the current day to determine whether the call should be blocked.

9. The apparatus of claim 8, wherein if the call is not a solicitation then continuing with the call transmission.

10. The apparatus of claim 8, wherein the processor is configured to block the call responsive to matching the area code with the at least one call block entry.

11. The apparatus of claim 8, wherein the processor is configured to determine that the area code is not blocked by the at least one call block entry, and determine whether the call is violating an additional call regulation.

12. The apparatus of claim 11, wherein the additional call regulation is at least one of a state regulation and a Federal regulation.

13. The apparatus of claim 12, wherein the state regulation is applied to the call based on the area code of the call and an area code of the state stored in the call suppression database.

14. The apparatus of claim 13, wherein the state regulation blocks the call based on a prohibited calling window of time that solicitation calls are not permitted to be made.

15. A non-transitory computer readable storage medium configured to store instructions that when executed cause a processor to perform determining whether to perform telephone call blocking, the processor being further configured to perform:
   initiating an outgoing telephone call from a call server to a destination number comprising an area code;
   determining whether the outgoing call is a solicitation call;
   determining the area code of the call and performing a lookup operation of the area code in a call suppression database;
   retrieving at least one call block entry for a current day from the call suppression database; and
   comparing the area code to the at least one call block entry for the current day to determine whether the call should be blocked.

16. The non-transitory computer readable storage medium of claim 15, wherein if the call is not a solicitation then routing the call.

17. The non-transitory computer readable storage medium of claim 15, wherein the processor is further configured to perform:
   blocking the call responsive to matching the area code with the at least one call block entry.

18. The non-transitory computer readable storage medium of claim 15, wherein the processor is further configured to perform:
- determining that the area code is not blocked by the at least one call block entry; and
- determining whether the call is violating an additional call regulation.

19. The non-transitory computer readable storage medium of claim 18, wherein the additional call regulation is at least one of a state regulation and a Federal regulation.

20. The non-transitory computer readable storage medium of claim 19, wherein the state regulation is applied to the call based on the area code of the call and an area code of the state stored in the call suppression database, and the state regulation blocks the call based on a prohibited calling window of time that solicitation calls are not permitted to be made.

* * * * *